(12) United States Patent
Le Grand

(10) Patent No.: US 8,108,659 B1
(45) Date of Patent: Jan. 31, 2012

(54) CONTROLLING ACCESS TO MEMORY RESOURCES SHARED AMONG PARALLEL SYNCHRONIZABLE THREADS

(75) Inventor: Scott M. Le Grand, Soquel, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1168 days.

(21) Appl. No.: 11/857,627

(22) Filed: Sep. 19, 2007

Related U.S. Application Data

(60) Provisional application No. 60/864,381, filed on Nov. 3, 2006.

(51) Int. Cl.
G06F 7/38 (2006.01)
G06F 9/00 (2006.01)
G06F 9/44 (2006.01)
G06F 15/00 (2006.01)

(52) U.S. Cl. .................................................. 712/225
(58) Field of Classification Search .................. None
See application file for complete search history.

(56) References Cited

U.S. PATENT DOCUMENTS

| | | | |
|---|---|---|---|
| 5,404,469 A * | 4/1995 | Chung et al. | 712/215 |
| 5,434,995 A | 7/1995 | Oberlin et al. | |
| 5,721,921 A | 2/1998 | Kessler et al. | |
| 5,928,351 A | 7/1999 | Horie et al. | |
| 6,085,303 A | 7/2000 | Thorson et al. | |
| 6,216,174 B1 | 4/2001 | Scott et al. | |
| 6,530,000 B1 * | 3/2003 | Krantz et al. | 711/151 |
| 6,897,871 B1 | 5/2005 | Morein et al. | |
| 7,165,252 B1 * | 1/2007 | Xu | 718/102 |

OTHER PUBLICATIONS

Eggers et al. "Simultaneous multithreading: A platform for next-generation processors" IEEE Micro, Sep./Oct. 1997(vol. 17, No. 5) pp. 12-19.

Johnson et al., "A Distributed Hardware Mechanism for Process Synchronization on Shared-Bus Multiprocessors," 1994; IEEE Computer Society; ICPP '94, pp. 268-275.

* cited by examiner

*Primary Examiner* — Corey S Faherty
(74) *Attorney, Agent, or Firm* — Kilpatrick Townsend & Stockton LLP

(57) ABSTRACT

Thread synchronization techniques are used to control access to a memory resource (e.g., a counter) that is shared among multiple threads. Each thread has a unique identifier and threads are assigned to instances of the shared resource so that at least one instance is shared by two or more threads. Each thread assigned to a particular instance of the shared resource has a unique ordering index. A thread is allowed to access its assigned instance of the resource at a point in the program code determined by its ordering index. The threads are advantageously synchronized (explicitly or implicitly) so that no more than one thread attempts to access the same instance of the resource at a given time.

17 Claims, 5 Drawing Sheets

```
510 — if (tid%k == 0) {                    500
           counter[myCounter]++;
       }
512 — synchronize( );

520 — if (tid%k == 1) {
           counter[myCounter]++;
       }
522 — synchronize( );

...

590 — if (tid%k == k-1) {
           counter[myCounter]++;
       }
592 — synchronize( );
```

FIG. 5

```
610 — if (tid%k == 0) {                    600
           counter[myCounter]++;
       }

620 — if (tid%k == 1) {
           counter[myCounter]++;
       }

...

690 — if (tid%k == k-1) {
           counter[myCounter]++;
       }
```

FIG. 6

CONTROLLING ACCESS TO MEMORY RESOURCES SHARED AMONG PARALLEL SYNCHRONIZABLE THREADS

CROSS-REFERENCES TO RELATED APPLICATIONS

This application claims the benefit of U.S. Provisional Application No. 60/864,381, filed Nov. 3, 2006, entitled "Controlling Access to Memory Resources Shared among Parallel Synchronizable Threads," which disclosure is incorporated herein by reference for all purposes.

The present disclosure is related to commonly-assigned co-pending application Ser. No. 11/303,780, filed Dec. 15, 2005, entitled "Synchronization of Threads in a Cooperative Thread Array," and to commonly-assigned co-pending application Ser. No. 11/836,429, filed Aug. 9, 2007, entitled "A Radix Sort Algorithm for Graphics Processing Units," the respective disclosures of which are incorporated herein by reference for all purposes.

BACKGROUND OF THE INVENTION

The present invention relates in general to parallel data processing and in particular to sharing access to a memory resource among parallel synchronizable threads.

In data processing, it is often desirable to count the number of occurrences of each of various events or conditions. For example, the well-known radix sort algorithm depends on knowing the number of items of each type in a sample set of items to be sorted. Accordingly, most implementations of radix sort include a counting stage that counts the number of items of each possible type, followed by a sorting stage that uses the item counts to arrange the items in the desired order. Radix sort is widely used in applications ranging from physics modeling (e.g., for video games) to statistical analysis (e.g., in bioinformatics).

Conventionally, to count occurrences of each of a number (m) of events or conditions over a sample set of items, a set of m counters is defined. Each item in the sample set is analyzed in turn to determine which of the m events or conditions has occurred, and the appropriate counter (or counters if the m events or conditions are not mutually exclusive) is updated.

In a parallel processor, processing time can be reduced by processing multiple items from the sample set in parallel, e.g., using multiple processing threads, each of which processes a different subset of the sample set. If each thread has its own set of m counters, the threads can proceed independently of each other. When all items have been processed, a final tally for the entire sample set can be determined by summing over the corresponding counters from each per-thread set. This approach works well as long as sufficient memory space is available to maintain m counters per thread. If the number of threads and/or the number m of events or conditions of interest becomes large enough, this approach is no longer practical.

The total amount of memory required can be reduced by sharing counters among two or more threads. As is known in the art, where a counter is shared, care must be taken to ensure that only one thread at a time attempts to update the counter. One solution involves performing the counter update as an atomic operation: that is, one thread reads, modifies and writes back the counter value before any other thread can intervene. Atomic operations can be relatively slow, however. Further, with conventional atomic operations, the order in which different threads access the counter is not consistent, and lack of a consistent ordering among the threads can make it difficult or impossible to exploit parallel processing in certain algorithms, such as radix sort.

It would therefore be desirable to provide improved techniques for controlling access to a memory resource that is shared among multiple concurrent threads.

BRIEF SUMMARY OF THE INVENTION

Embodiments of the present invention use thread synchronization techniques to control access to a memory resource (e.g., a counter) that is shared among multiple threads. Each thread has a unique identifier (tid), and threads are assigned to instances of the shared resource so that up to k threads share each instance. Each thread assigned to a particular instance of the shared resource has a unique ordering index (which may be defined, e.g., as tid % k, where "%" is the modulo operator). A thread is allowed to access its assigned instance of the resource at a point in the program code determined by its ordering index, and the threads are advantageously synchronized (explicitly or implicitly) so that no more than one thread attempts to access the same instance of the resource at a given time. One consequence of this approach is that the order in which different threads access the same instance of a shared resource is well defined.

According to one aspect of the present invention, a method of controlling access to a shared memory resource (e.g., a counter or an array of counters) includes defining a thread array having a number of threads. Each thread has a unique thread identifier, and all of the threads are configured to execute a same program that includes updating a shared memory resource. A number (C) of instances of the shared memory resource are defined, where the number C is less than the number of threads in the thread array. The thread array is executed. During execution, each thread is assigned to one of the C instances of the shared memory resource. The number of threads assigned to any one of the instances of the shared memory resource is at least one and not more than a number k, where k is at least two. An ordering index is determined for each thread; any ordering index may be used as long as no two threads that are assigned to the same instance of the shared memory resource have the same ordering index. Within each of the threads, an instruction to update the instance of the shared memory resource assigned thereto is executed. A time at which the instruction is executed for each thread is controlled such that only threads with a same ordering index update the respective instances of the shared memory resource assigned thereto at the same time. For instance, in some embodiments, a first instruction is executed that allows only threads having a first value of the ordering index to update the instance of the shared memory resource assigned thereto. The threads are then synchronized at a first synchronization point after the execution of first instruction. After synchronizing the threads, a second instruction is executed that allows only threads having a second value of the ordering index to update the instance of the shared memory resource assigned thereto.

In some embodiments, assigning threads to instances of the shared memory resource is based on thread identifiers. For instance, if the thread identifiers are (or can be converted to) sequential identifiers, up to k threads with sequential thread identifiers can be to each instance of the shared memory resource. Similarly, the ordering index can be determined based on thread identifiers, e.g., by computing, for each thread, an index i=tid % k, wherein tid is the thread identifier of the thread and using the index i as the ordering index.

According to another aspect of the present invention, a method of sorting data values includes defining a thread array having a number of threads, where each thread has a unique thread identifier. All of the threads are configured to execute a same program, which includes updating an array of counters that includes one counter for each of a number of possible data values to reflect an actual data value determined by the thread. A number (C) of instances of the array of counters are defined, wherein the number C is less than the number of threads in the thread array. The thread array is executed. During execution, each thread is assigned to one of the C instances of the array of counters. The number of threads assigned to each instance of the array of counters is at least one and not more than a number k, where k is at least two. An ordering index for each thread; any ordering index may be used as long as no two threads that are assigned to the same instance of the shared memory resource have the same ordering index. An actual data value is determined for each thread, wherein the actual data value corresponds to one of the counters in the array of counters. Within each of the threads, an instruction is executed to update the counter corresponding to the actual data value. The time at which the instruction is executed for each thread is controlled such that only threads with a same ordering index perform the update at the same time. Subsequently to executing the instruction to update the counter, the values stored in the instances of the array of counters are used to sort the actual data values.

According to still another aspect of the present invention, a computer program product is provided. The computer program product includes a computer readable medium encoded with program code for controlling operation of a computer system. The program code includes program code for defining a thread array having a plurality of threads to be executed by the computer system. Each thread has a unique thread identifier. All of the threads are configured to execute a same program, which includes updating a shared memory resource. The program code also includes program code for defining a number (C) of instances of the shared memory resource, where the number C is less than the number of threads in the thread array. The program code also includes program code to be executed by the threads of the thread array, which includes program code for assigning each thread to one of the C instances of the shared memory resource in a manner such that that the number of threads assigned to any one of the instances of the shared memory resource is at least one and not more than a number k, where k is at least two. The program code to be executed by the threads also includes program code for determining an ordering index for each thread such that no two threads that are assigned to the same instance of the shared memory resource have the same ordering index. The program code to be executed by the threads also includes program code for updating the shared memory resource, including program code for controlling a time at which the instruction is executed by each thread such that only threads with a same ordering index update the respective instances of the shared memory resource assigned thereto at the same time.

The following detailed description together with the accompanying drawings will provide a better understanding of the nature and advantages of the present invention.

BRIEF DESCRIPTION OF THE DRAWINGS

FIG. 5 is a pseudocode fragment illustrating a technique for updating a shared memory resource according to an embodiment of the present invention;

FIG. 6 is a pseudocode fragment illustrating a technique for updating a shared memory resource according to another embodiment of the present invention;

DETAILED DESCRIPTION OF THE INVENTION

Embodiments of the present invention use thread synchronization techniques to manage access to a memory resource (e.g., a counter) that is shared among multiple threads. Each thread has a unique identifier (tid), and threads are assigned to instances of the shared resource so that up to k threads share each instance. Each thread assigned to a particular instance of the shared resource has a unique ordering index (which may be defined, e.g., as tid % k). A thread is allowed to access its assigned instance of the resource at a point in the program code determined by its ordering index, and the threads are advantageously synchronized (explicitly or implicitly) so that no more than one thread attempts to access the same instance of the resource at a given time. One consequence of this approach is that the order in which different threads access the same instance of a shared resource is well defined.

System Overview

Figure 1:
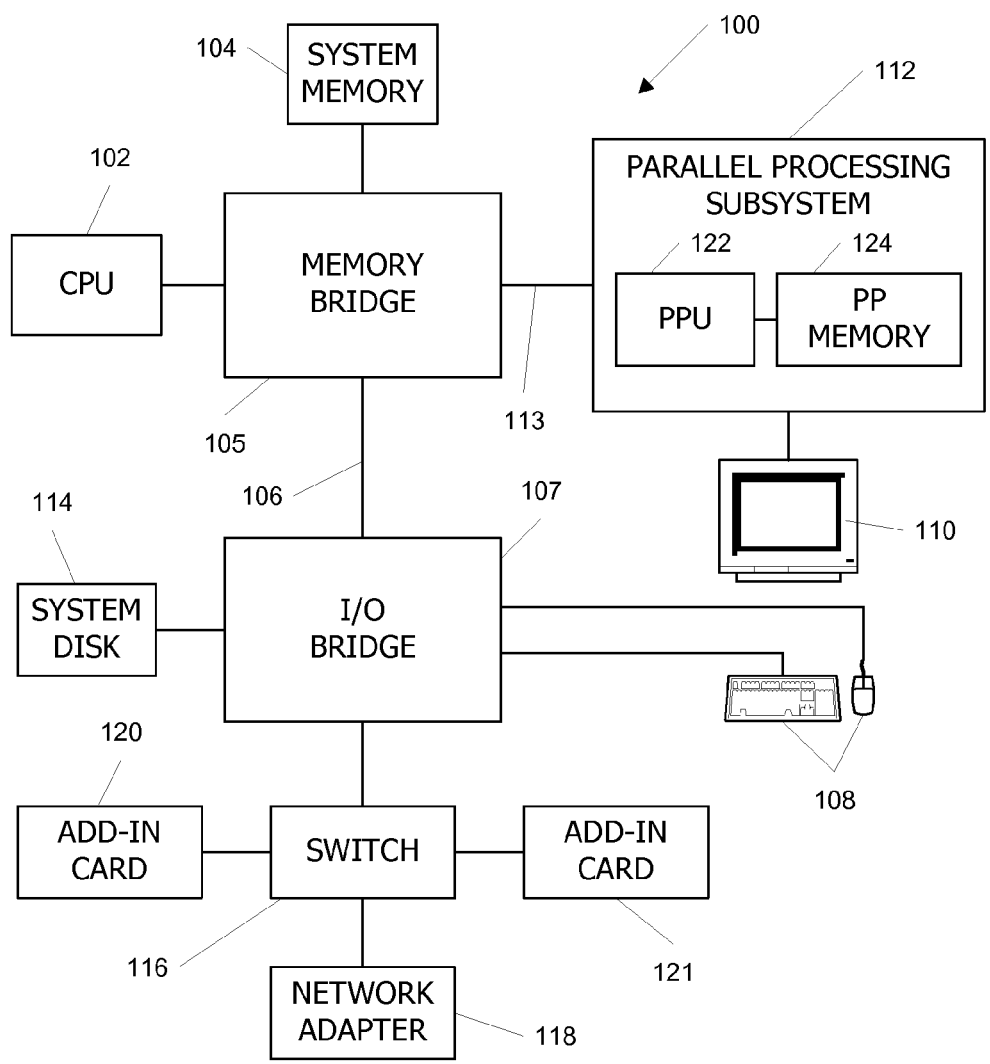
FIG. 1 is a block diagram of a computer system according to an embodiment of the present invention.

FIG. 1 is a block diagram of a computer system 100 according to an embodiment of the present invention. Computer system 100 includes a central processing unit (CPU) 102 and a system memory 104 communicating via a bus path that includes a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to I/O bridge 107 via a bus or other communication path 113 (e.g., a PCI Express or Accelerated Graphics Port link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, and the like, may also be connected to I/O bridge 107. Communication paths interconnecting the various components in FIG. 1 may be implemented using any suitable protocols, such as PCI (Peripheral Component Interconnect), PCI Express (PCI-E), AGP (Accelerated Graphics Port), Hyper-Transport, or any other bus or point-to-point communication protocol(s), and connections between different devices may use different protocols as is known in the art.

Parallel processing subsystem 112 includes a parallel processing unit (PPU) 122 and a parallel processing (PP) memory 124, which may be implemented, e.g., using one or more integrated circuit devices such as programmable processors, application specific integrated circuits (ASICs), and memory devices. PPU 122 advantageously implements a highly parallel processor including one or more processing cores, each of which is capable of executing a large number (e.g., hundreds or thousands) of threads concurrently. PPU 122 can be programmed to perform a wide array of computations, including linear and nonlinear data transforms, filtering of video and/or audio data, modeling (e.g., applying laws of physics to determine position, velocity and other attributes of objects), image rendering, and so on. PPU 122 may transfer data from system memory 104 and/or PP memory 124 into internal memory, process the data, and write result data back to system memory 104 and/or PP memory 124, where such data can be accessed by other system components, including, e.g., CPU 102. In some embodiments, PPU 122 is a graphics processor that can also be configured to perform various tasks related to generating pixel data from graphics data supplied by CPU 102 and/or system memory 104 via memory bridge 105 and bus 113, interacting with PP memory 124 (which can be used as graphics memory including, e.g., a conventional frame buffer) to store and update pixel data, delivering pixel data to display device 110, and the like. In some embodiments, PP subsystem 112 may include one PPU 122 operating as a graphics processor and another PPU 122 used for general-purpose computations. The PPUs may be identical or different, and each PPU may have its own dedicated PP memory device(s).

CPU 102 operates as the master processor of system 100, controlling and coordinating operations of other system components. In particular, CPU 102 issues commands that control the operation of PPU 122. In some embodiments, CPU 102 writes a stream of commands for PPU 122 to a command buffer, which may be in system memory 104, PP memory 124, or another storage location accessible to both CPU 102 and PPU 122. PPU 122 reads the command stream from the command buffer and executes commands asynchronously with operation of CPU 102.

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, PP subsystem 112 is connected to I/O bridge 107 rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

The connection of PPU 122 to the rest of system 100 may also be varied. In some embodiments, PP system 112 is implemented as an add-in card that can be inserted into an expansion slot of system 100. In other embodiments, a PPU can be integrated on a single chip with a bus bridge, such as memory bridge 105 or I/O bridge 107. In still other embodiments, some or all elements of PPU 122 are integrated with CPU 102.

A PPU may be provided with any amount of local PP memory, including no local memory, and may use local memory and system memory in any combination. For instance, PPU 122 can be a graphics processor in a unified memory architecture (UMA) embodiment; in such embodiments, little or no dedicated graphics memory is provided, and PPU 122 would use system memory exclusively or almost exclusively. In UMA embodiments, the PPU may be integrated into a bridge chip or provided as a discrete chip with a high-speed link (e.g., PCI-E) connecting the GPU to the bridge chip and system memory.

It is also to be understood that any number of PPUs may be included in a system, e.g., by including multiple PPUs on a single add-in card or by connecting multiple add-in cards to path 113. Multiple PPUs may be operated in parallel to process data at higher throughput than is possible with a single PPU.

Systems incorporating PPUs may be implemented in a variety of configurations and form factors, including desktop, laptop, or handheld personal computers, servers, workstations, and so on.

Core Overview

Figure 2:
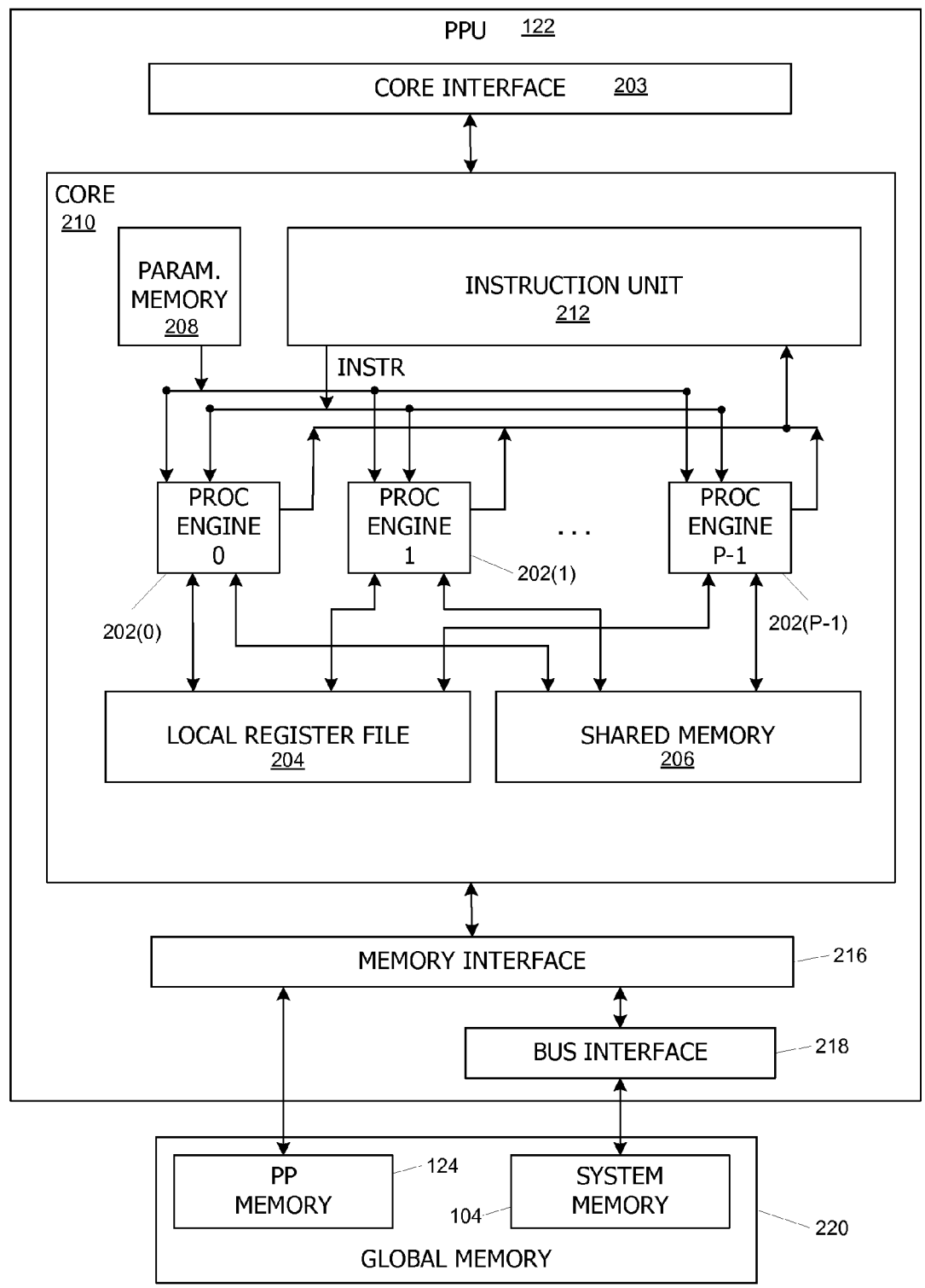
FIG. 2 is a block diagram of a parallel processing unit usable in an embodiment of the present invention.

FIG. 2 is a block diagram of a PPU 122 usable in an embodiment of the present invention. PPU 122 includes a core 210 configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units.

In one embodiment, core 210 includes an array of P (e.g., 8, 16, etc.) parallel processing engines 202 configured to receive SIMD instructions from a single instruction unit 212. Each processing engine 202 advantageously includes an identical set of functional units (e.g., arithmetic logic units, etc.). The functional units may be pipelined, allowing a new instruction to be issued before a previous instruction has finished, as is known in the art. Any combination of functional units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

Each processing engine 202 uses space in a local register file (LRF) 204 for storing its local input data, intermediate results, and the like. In one embodiment, local register file 204 is physically or logically divided into P lanes, each having some number of entries (where each entry might store, e.g., a 32-bit word). One lane is assigned to each processing engine 202, and corresponding entries in different lanes can be populated with data for different threads executing the same program to facilitate SIMD execution. In some embodiments, each processing engine 202 can only access LRF entries in the lane assigned to it. The total number of entries in local register file 204 is advantageously large enough to support multiple concurrent threads per processing engine 202.

Each processing engine 202 also has access to an on-chip shared memory 206 that is shared among all of the processing engines 202 in core 210. Shared memory 206 may be as large as desired, and in some embodiments, any processing engine 202 can read to or write from any location in shared memory 206 with equally low latency (e.g., comparable to accessing local register file 204). In some embodiments, shared memory 206 can be implemented using shared cache memory. An example implementation of shared memory 206 is described below.

In addition to shared memory 206, some embodiments also provide additional on-chip parameter memory and/or cache (s) 208, which may be implemented, e.g., as a conventional RAM or cache. Parameter memory/cache 208 can be used, e.g., to hold state parameters and/or other data (e.g., textures or primitives for a shader program) that may be needed by multiple threads. Processing engines 202 also have access via a memory interface 216 to additional off-chip global memory 220, which includes, e.g., PP memory 124 and/or system memory 104, with system memory 104 being accessible by memory interface 216 via a bus interface 218; it is to be understood that any memory external to PPU 122 may be used as global memory 220. Memory interface 216 and bus interface 218 may be of generally conventional design, and other appropriate interfaces may be substituted. Processing engines 202 are advantageously coupled to memory interface 216 via an interconnect (not explicitly shown) that allows any processing engine 202 to access global memory 220.

In one embodiment, each processing engine 202 is multi-threaded and can execute up to some number G (e.g., 24) of threads concurrently, e.g., by maintaining current state information associated with each thread in a different portion of its assigned lane in local register file 204. Processing engines 202 are advantageously designed to switch rapidly from one thread to another so that instructions from different threads can be issued in any sequence without loss of efficiency.

Instruction unit 212 is configured such that, for any given processing cycle, the same instruction (INSTR) is issued to all P processing engines 202. Thus, at the level of a single clock cycle, core 210 implements a P-way SIMD microarchitecture. Since each processing engine 202 is also multi-threaded, supporting up to G threads, core 210 in this embodiment can have up to P*G threads executing concurrently. For instance, if P=16 and G=24, then core 210 supports up to 384 concurrent threads.

Because instruction unit 212 issues the same instruction to all P processing engines 202 in parallel, core 210 is advantageously used to process threads in "SIMD groups." As used herein, a "SIMD group" refers to a group of up to P threads of execution of the same program on different input data, with one thread of the group being assigned to each processing engine 202. (A SIMD group may include fewer than P threads, in which case some of processing engines 202 will be idle during cycles when that SIMD group is being processed.) Since each processing engine 202 can support up to G threads, it follows that up to G SIMD groups can be executing in core 210 at any given time.

On each clock cycle, one instruction is issued to all P threads making up a selected one of the G SIMD groups. To indicate which thread is currently active, a "group index" (GID) for the associated thread may be included with the instruction. Processing engine 202 uses group index GID as a context identifier, e.g., to determine which portion of its assigned lane in local register file 204 should be used when executing the instruction. Thus, in a given cycle, all processing engines 202 in core 210 are nominally executing the same instruction for different threads in the same group. (In some instances, some threads in a group may be temporarily idle, e.g., due to conditional or predicated instructions, divergence at branches in the program, or the like.)

Operation of core 210 is advantageously controlled via a core interface 203. In some embodiments, core interface 203 receives data to be processed (e.g., vertex data and/or pixel data) as well as state parameters and commands defining how the data is to be processed (e.g., what program is to be executed). Core interface 203 can load data to be processed into shared memory 206 and parameters into parameter memory 208. Core interface 203 also initializes each new thread or SIMD group in instruction unit 212, then signals instruction unit 212 to begin executing the threads. When execution of a thread or SIMD group is completed, core 210 advantageously notifies core interface 203. Core interface 203 can then initiate other processes, e.g., to retrieve output data from shared memory 206 and/or to prepare core 210 for execution of additional threads.

It will be appreciated that the core architecture described herein is illustrative and that variations and modifications are possible. Any number of processing engines may be included. In some embodiments, each processing engine has its own local register file, and the allocation of local register file entries per thread can be fixed or configurable as desired. Further, while only one core 210 is shown, a PPU 122 may include any number of cores 210, with appropriate work distribution logic to distribute incoming processing tasks among the available cores 210, further increasing the processing capacity. Each core 210 advantageously operates independently of other cores 210 and has its own processing engines, shared memory, and so on. Where multiple cores 210 are present, PPU 122 may include a work distribution unit (not explicitly shown) that distributes processing tasks among the available cores.

Cooperative Thread Array Overview

In some embodiments, multithreaded processing core 210 of FIG. 2 executes general-purpose computations using cooperative thread arrays (CTAs). As used herein, a "CTA" is a group of multiple threads that concurrently execute the same program on an input data set to produce an output data set. Each thread in the CTA is assigned a unique thread identifier ("thread ID") that is accessible to the thread during its execution. The thread ID controls various aspects of the thread's processing behavior. For instance, a thread ID may be used to determine which portion of the input data set a thread is to process, to identify one or more other threads with which a given thread is to share an intermediate result, and/or to determine which portion of an output data set a thread is to produce or write.

CTAs are advantageously employed to perform computations that lend themselves to a data parallel decomposition, i.e., application of the same processing algorithm to different portions of an input data set in order to effect a transformation of the input data set to an output data set. Examples include matrix algebra, linear and/or nonlinear transforms in any number of dimensions (e.g., fast Fourier transforms), various filtering algorithms, radix sort, and so on. The processing algorithm to be applied to each portion of the input data set is specified in a "CTA program," and each thread in a CTA executes the same CTA program on one portion of the input data set. A CTA program can implement algorithms using a wide range of mathematical and logical operations, and the program can include conditional or branching execution paths and direct and/or indirect memory access.

Threads in a CTA can share input data, processing parameters, and/or intermediate results with other threads in the same CTA using shared memory 206. In some embodiments, a CTA program includes an instruction to compute an address in shared memory 206 to which particular data is to be written, with the address being a function of thread ID. Each thread computes the function using its own thread ID and writes to the corresponding location. The address function can be defined such that different threads write to different locations; as long as the function is deterministic, the location written to by any thread is predictable. The CTA program can also include an instruction to compute an address in shared memory 206 from which data is to be read, with the address being a function of thread ID. By defining suitable functions and exploiting synchronization techniques, e.g., as described in above-referenced application Ser. No. 11/303,780, different threads can access the same location at different times. For instance, data can be written to a given location in shared memory 206 by one thread and read from that location by a different thread in a predictable manner. Consequently, any desired pattern of data sharing among threads can be supported, and any thread in a CTA can share data with any other thread in the same CTA.

Since all threads in a CTA execute the same program, any thread can be assigned any thread ID, as long as each valid thread ID is assigned to only one thread. In one embodiment, thread IDs are assigned sequentially to threads as they are launched, as described in above-referenced application Ser. No. 11/303,780. It should be noted that as long as data sharing is controlled by reference to thread IDs, the particular assignment of threads to processing engines will not affect the result of the CTA execution. Thus, a CTA program can be independent of the particular hardware on which it is to be executed.

Any unique identifier (including but not limited to numeric identifiers) can be used as a thread ID. In one embodiment, if a CTA includes some number (7) of threads, thread IDs are simply sequential (one-dimensional) index values from 0 to T−1. In other embodiments, multidimensional indexing schemes can be used.

In addition to thread IDs, some embodiments also provide a CTA identifier that is common to all threads in the CTA. CTA identifiers can be helpful, e.g., where an input data set is to be processed using multiple CTAs that process different (possibly overlapping) portions of an input data set. The CTA identifier may be stored in a local register of each thread, in a state register accessible to all threads of the CTA, or in other storage accessible to the threads of the CTA. While all threads within a CTA are executed concurrently, there is no requirement that different CTAs are executed concurrently, and the hardware need not support sharing of data between threads in different CTAs.

It will be appreciated that the size (number of threads) of a CTA and number of CTAs required for a particular application will depend on the application. Thus, the size of a CTA, as well as the number of CTAs to be executed, are advantageously defined by a programmer or driver program and provided to core 210 and core interface 203 as state parameters.

CTAs are described in further detail in above-referenced application Ser. No. 11/303,780. Those skilled in the art will appreciate that access control for a shared memory resource according to an embodiment of the present invention is not limited to CTAs or graphics; access control techniques described herein can be used in any circumstance where two or more concurrent threads in a processing core benefit from sharing access to the same memory resource.

Access to a Shared Memory Resource

In accordance with an embodiment of the present invention, the threads of a CTA may update various memory resources (e.g., counters) during the course of CTA program execution. Because a CTA can be quite large (e.g., 384 or 768 threads in some embodiments), it may be desirable to provide a number (C) of instances of the shared memory resource that is less than the number of threads in the CTA and to have multiple threads share the same instance of the resource. The CTA program advantageously includes code that guarantees that no more than one thread will attempt to access a given instance of the resource at any given time.

To provide such a guarantee, the threads of a CTA are advantageously divided into a number (C) of subsets equal to the number of instances of the shared memory resource. The threads in each subset are all assigned to the same instance of the resource; threads in different subsets are assigned to different instances. An "ordering index" is assigned to the threads within each subset, and access to the resource is controlled based on the ordering index. In one embodiment, the first thread in each subset accesses its assigned instance of the resource, then the second thread in each subset, and so on.

More specifically, in some embodiments, threads are divided into subsets and assigned to instances of the shared memory resource based on their unique thread IDs. For example, suppose a CTA has a number T of threads that are assigned sequential thread IDs (tid) from 0 to T−1. Based on the total number T of threads in the CTA and the number C of instances of the shared memory resource, the maximum number k of threads that will share each instance can be determined. For instance if T is divisible by C, then k=T/C can be used, with k threads being assigned to each instance. If T is not evenly divisible by C, then k=[T/C]+1 can be used, where [T/C] is the integer portion of T/C. Exactly k threads are assigned to each of the first C−1 instances, and all remaining threads (which will be fewer than k threads) are assigned to the last instance.

Figures 3, 4:
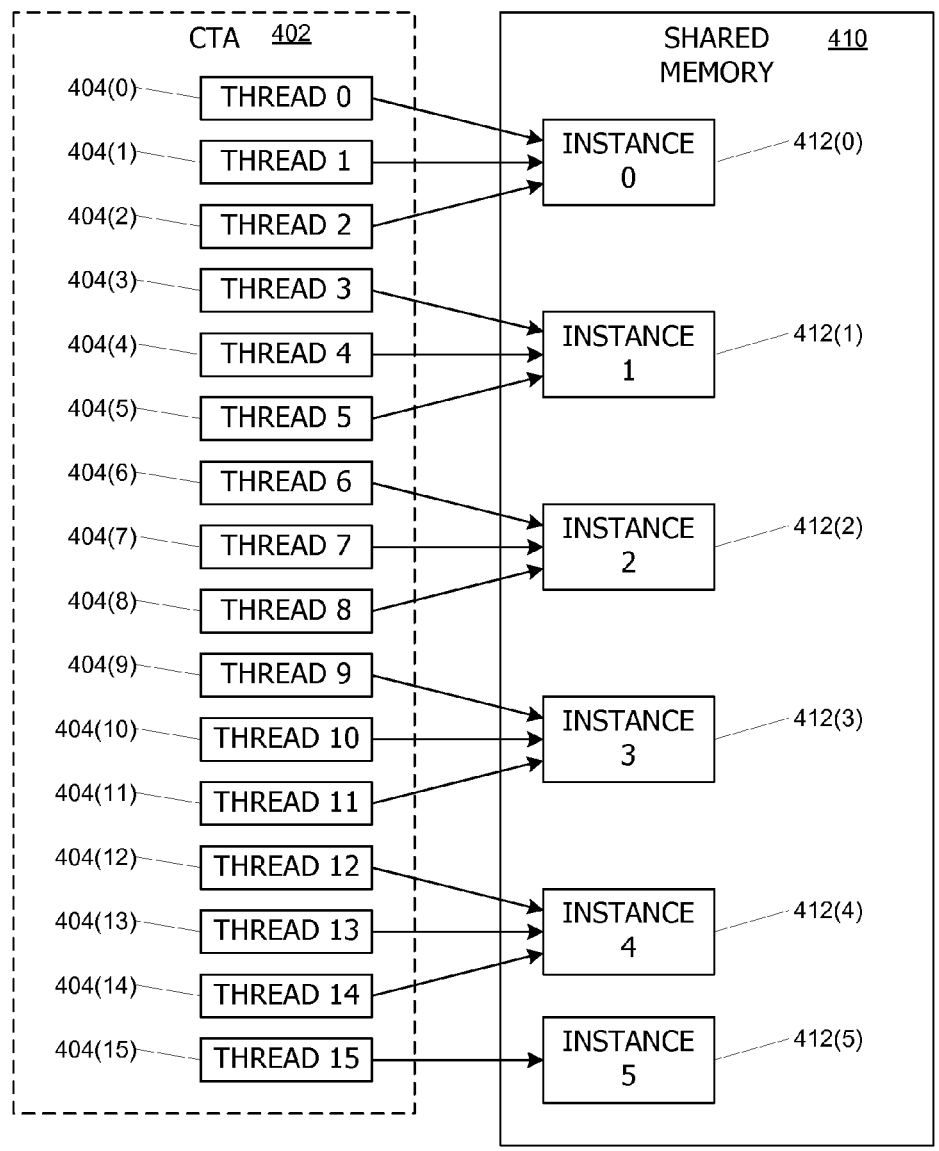
FIG. 3 is a pseudocode fragment illustrating a technique for assigning threads to instances of a shared memory resource according to an embodiment of the present invention.
FIG. 4 is a mapping diagram showing the assignment of threads to instances of a shared resource according to an embodiment of the present invention.

In one embodiment, assignment of threads to instances of a shared memory resource is implemented by including in the CTA program the pseudocode fragment 300 shown in FIG. 3. In fragment 300, tid is the thread ID of a thread that executes this code, and counter[0:C−1] represents C instances of the shared memory resource (in this example, a counter). Line 310 initializes the C instances of the counter. Line 315 determines k, the maximum number of threads that will share an instance of the counter, e.g., using the rules described above. Line 320, executed in a "for" loop 330, results in each thread setting a "myCounter" variable to a value between 0 and C−1.

It will be appreciated that the pseudocode fragment described and shown herein is illustrative and that variations and modifications are possible. Those skilled in the art will recognize that all pseudocode fragments disclosed herein may be implemented in any programming language, including high-level languages and/or machine-executable code. Since each thread has a unique thread ID, in embodiments where the thread IDs are not sequential scalars, the thread IDs can be converted to sequential scalars for purposes of assigning threads to instances of the resource.

FIG. 4 is a mapping diagram showing the assignment of threads to instances of a shared resource according to an embodiment of the present invention. This mapping results, e.g., from executing the pseudocode of FIG. 3. In this example, a CTA 402 includes T=16 threads 404. (Herein, multiple instances of like objects are denoted with reference numbers identifying the object and parenthetical numbers identifying the instance where needed.) A shared memory 410 includes C=6 instances 412 of a shared memory resource (e.g., a counter). Since 16 is not evenly divisible by 6, in this example, k=[T/C]+1=3. Thus, three threads 404 are assigned to each instance 412, except for the last instance 412(5). In accordance with pseudocode fragment 300 of FIG. 3, threads 404(0), 404(1) and 404(2) are assigned to instance 412(0); threads 404(3), 404(4) and 404(5) are assigned to instance 412(1); and so on, as shown by the arrows. Thread 404(15) is assigned to instance 412(5).

It will be appreciated that the mapping of FIG. 4 is illustrative and that variations and modifications are possible. A CTA may include any number of threads, and any number of instances of the shared memory resource may be used, as long as at least some instances are shared by two or more threads. In some embodiments, the number of threads may be evenly divisible by the number of instances of the shared memory resource, in which case the same number (k) of threads can be assigned to each instance.

The ordering index for the threads in each subset can also be determined based on the thread ID. For example, in one embodiment, the ordering index (i) for a thread is given by i=tid % k, where % is the well-known modulo operator. Thus, referring to FIG. 4, threads 402(0), 402(3), 402(6), 402(9), 402(12) and 402(15) each would have ordering index i=1; threads 402(1), 402(4), 402(7), 402(10), and 402(13) each would have ordering index i=2; and threads 402(2), 402(5), 402(8), 402(11), and 402(14) each would have ordering index i=3.

Ordering index values are advantageously used together with thread synchronization to control access to the shared memory resource. FIG. 5 is a pseudocode fragment 500 that can be used to update a shared memory resource (in this example, a counter) according to an embodiment of the present invention. It is assumed that each thread has already assigned its myCounter variable in accordance with pseudocode fragment 300 of FIG. 3.

At line 510, threads whose thread ID is evenly divisible by k (in other words, threads whose ordering index i is zero) increment their assigned instances of the counter. The remaining threads do nothing. As shown in FIG. 4 for a case where k=3, each such thread is assigned to a different instance of the counter. Line 512 is a synchronize( ) command. This command ensures that no thread executes any code subsequent to line 512 until all threads have executed all code prior to line 512. For instance, in one embodiment, when a thread encounters this command, it advantageously sends an "arrival" signal to an instruction unit (e.g., instruction unit 212 of FIG. 2) that controls instruction issue for the threads of the CTA. After receiving the "arrival" signal from a particular thread, the instruction unit defers issuing further instructions for that thread until such time as the instruction unit receives corresponding signals from all threads of the CTA. In embodiments such as that shown in FIG. 2, where the instruction unit 212 issues SIMD instructions to SIMD groups of threads, arrival at the synchronization point may be detected and signaled on a per-SIMD-group basis, rather than for individual threads. Implementations of thread synchronization are described in above-referenced application Ser. No. 11/303,780. Those skilled in the art will appreciate that other techniques for synchronizing threads may be substituted; a particular synchronization technique is not critical to the present invention.

At line 520, threads with ordering index i=1 (i.e., threads for which tid % k=1) update, e.g., increment, their assigned instances of the counter. Again, as shown in FIG. 4 for a case where k=3, each such thread is assigned to a different instance of the counter. It should be noted that in the example of FIG. 4, no thread with tid % k=1 is assigned to counter instance 412(5). This does not present a problem; counter instance 412(5) simply does not receive any updates while threads are executing line 520. Line 522 is another synchronize( ) command, ensuring that no threads execute code subsequent to line 522 until all threads have executed all code prior to line 522.

Continuing in this manner, threads with each possible value of the ordering index eventually become eligible to update their assigned instances of the counter. Line 590 represents the last cycle of this procedure, in which threads with ordering index i=(k−1) update their assigned instances of the counter. Line 592 is a final synchronization point, guaranteeing that all threads have updated their counters before execution proceeds further.

It will be appreciated that the pseudocode fragment of FIG. 5 is illustrative and that variations and modifications are possible. For instance, the counter may be replaced with a different shared memory resource, and the threads may make any type of update to the shared memory resource. Further, whether a thread actually updates the resource when its turn arrives can be conditioned on any relevant information; thus, a thread might increment a counter when its turn arrives only if a particular event or condition is present in the data the thread is processing.

In one embodiment, multiple CTAs are used to implement a radix-sort algorithm. A first set of CTAs (which may include one or more CTAs) performs the counting phase, while a second set of CTAs (which may also include one or more CTAs) performs the sorting phase. For each CTA in the counting phase, the shared memory resource is an array of m counters, where m corresponds to the number of different possible values in the data set to be sorted. A two-dimensional array of C sets of m counters, counter[0:C−1][0:m−1], is defined. Each thread is assigned to a set of m counters, e.g., by setting the variable myCounter in accordance with pseudocode fragment 300 of FIG. 3. Each thread processes a different subset of the data elements in the data set to be sorted to determine which one of the m possible values corresponds to each data element. For each data element, the thread increments counter[myCounter][data], where "data" represents the value (0 to m−1) corresponding to the current data element. Pseudocode fragment 500, with appropriate modifications, can be used to control the order in which the threads increment counters. At the end of the counting phase, the counters are read out to external memory (e.g., global memory 220 of FIG. 2). Values in the different instances of corresponding counters can be summed before reading them out so that only one set of values is read out to external memory.

The CTAs that execute the sorting phase are launched after execution of the counting-phase CTAs is completed. An example of an implementation of sorting-phase CTAs is described in above-referenced application Ser. No. 11/836,429; other implementations may be substituted. The sorting-phase CTAs read the m counter values from global memory and use the counter values to sort the data. If the counting-phase CTAs did not sum the values in different instances of corresponding counters, the sorting-phase CTAs may read values for all of the instances and perform the summing operation.

Radix sort is advantageously performed for single bits or groups of bits (referred to as the "radix") within the data values being sorted. The summing and sorting operations are then repeated for the next bit or group of bits, until the data values are sorted. Choosing a larger radix reduces the number of passes through the summing and sorting operation but requires a larger number m of counters as the number of possible values of the radix increases. To support a larger number m of counters, it may be desirable to decrease the number of instances of the m counters and increase the number of threads that share each instance.

The order in which different threads of a subset access the same shared instance of the resource may be modified (e.g., starting with threads for which tid % k is (k−1) and working down). Alternative implementations of the code, e.g., using "for" loops, are also possible.

Further, in some embodiments, threads that access different instances of the shared resource might not be synchronized with each other. For instance, some embodiments may include synchronization commands that allow subsets of the threads to synchronize with each other without affecting other threads (e.g., as described in above-referenced application Ser. No. 11/303,780), and the "global" synchronization commands shown in FIG. 5 can be replaced with subset-specific synchronization commands. As long as the threads that share an instance of the resource synchronize with each other to prevent conflicting access requests, the desired behavior can be obtained. It may be desirable to include at least one global synchronization command (e.g., at line 592 of FIG. 5) to provide a point at which it is guaranteed that all threads have completed their updates to the shared memory resource.

In other embodiments, explicit synchronization of threads might not be necessary. For example, as described above with reference to FIG. 2, threads of a CTA may be executed in SIMD groups. Within a SIMD group, it is guaranteed that all threads execute the same instruction at the same time; in other words, the threads of a SIMD group are implicitly synchronized with each other at each instruction. In embodiments where thread synchronization is implicit, a pseudocode fragment 600 as shown in FIG. 6 can be used. Pseudocode fragment 600 includes lines 610, 620, and 690 corresponding to lines 510, 520 and 590 of pseudocode fragment 500 of FIG. 5. Unlike fragment 500, fragment 600 does not include synchronize( ) commands. Fragment 600 can be used in any case where it is guaranteed that all threads assigned to the same instance of a shared memory resource will execute line 610 before any of these threads executes line 620 (and so on through line 690), as is the case for threads within a SIMD group.

If the total number T of threads in the CTA is larger than the number (P) of threads in a SIMD group, fragment 600 can be used if all threads assigned to the same instance of the shared memory resource are in the same SIMD group. For example, if P=16, one instance of the resource can be provided for every 16 threads, and the 16 threads of each SIMD group can all be assigned to the same instance. In this embodiment, threads in different SIMD groups would not be synchronized with each other, but as long as instances of the resource are shared only by threads in the same SIMD group, there is no resource conflict. If desired, a global synchronize( ) command could be provided, e.g., after line 690, to provide a point at which it is guaranteed that all threads have completed their updates to the shared memory resource.

Alternatively, multiple instances of the resource could be provided for each SIMD group. Pseudocode fragment 600 combined with the implicit synchronization provided by a SIMD group results in execution without access conflicts.

Access-Control Processes

In the embodiments described above, groups of sequentially-numbered threads are assigned to share the same instance of a shared memory resource, and the ordering index of threads is determined by thread ID (e.g., the lowest-numbered thread assigned to a particular instance accesses that instance first). Those skilled in the art will recognize that other techniques can also be used to assign threads to instances of the resource and/or to order the threads assigned to the same instance.

Figure 7:
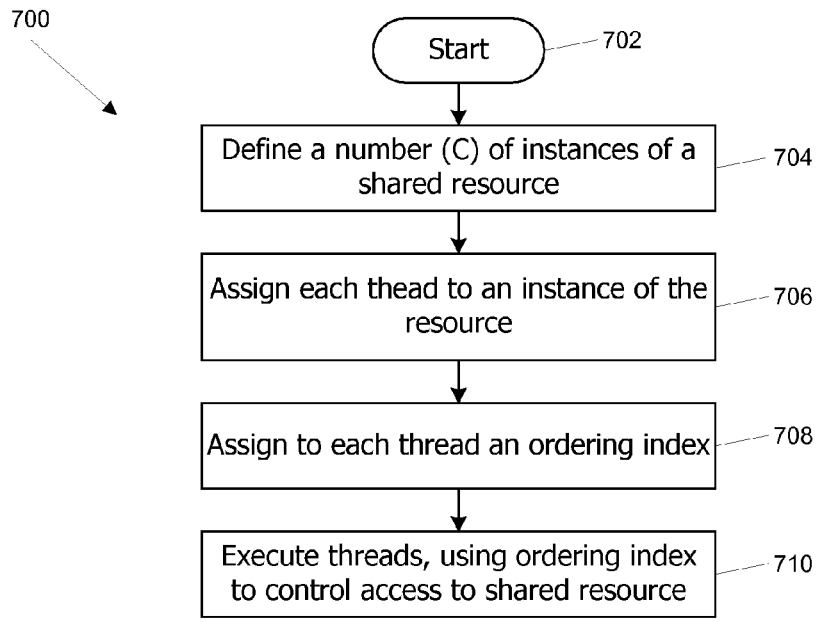
FIG. 7 is a flow diagram of a process for dividing and ordering concurrently executable threads for purposes of sharing access to a memory resource according to an embodiment of the present invention.

FIG. 7 is a flow diagram of a process 700 for dividing and ordering threads of a CTA for purposes of sharing access to a memory resource according to an embodiment of the present invention. Process 700 starts (step 702) when a number C of instances of a shared memory resource (such as a counter) is defined at step 704. The number of instances of the shared memory resource may be decided by the programmer, taking into account the capacity of the shared memory (e.g., the size of shared register file 206 of FIG. 2) and other demands that may be placed on the available shared memory during execution of the CTA program. In other embodiments, the number of instances might be determined automatically, e.g., based on information as to resources available in the processor that will execute the CTA.

At step 706, each thread of the CTA is assigned to one or another of the instances of the resource. At least one thread is advantageously assigned to each instance, and the total number of threads assigned to any instance is limited to k, where k is advantageously determined based on T and C, e.g., as described above. In embodiments described above, the first k threads (by thread ID) are assigned to the first instance of the resource, the second k threads are assigned to the second instance of the resource, and so on. Those skilled in the art will recognize that other procedures can be used to assign threads to instances of a shared memory resource.

At step 708, the threads are assigned an ordering index, e.g., from 0 to k−1. In the embodiment described above, the ordering index is just tid % k, but those skilled in the art will recognize that other rules could be used to assign ordering indices to the threads, as long as each thread that is assigned to the same instance of the resource has a different ordering index.

Figure 8:
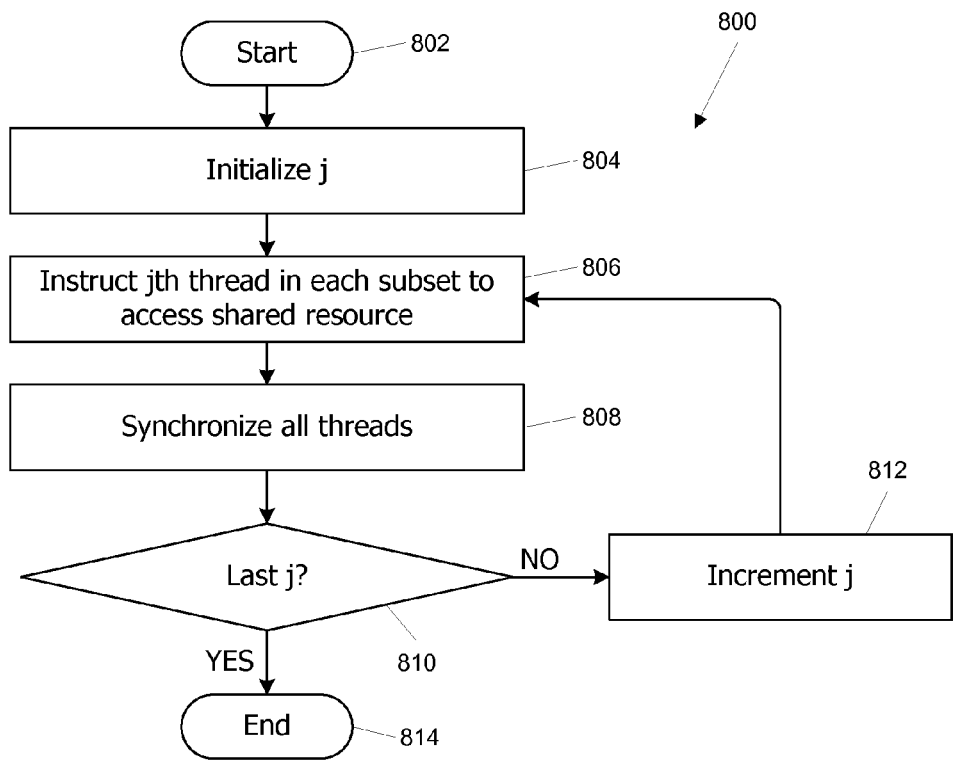
FIG. 8 is a flow diagram of a process for updating a shared resource during execution of concurrent threads according to an embodiment of the present invention.

At step 710, the threads are executed. The CTA program advantageously includes code for updating the shared resource that makes use of the ordering index to control the order in which threads within a subset access the resource. More specifically, FIG. 8 is a flow diagram of a process 800 for updating a shared resource during execution of CTA threads according to an embodiment of the present invention. In process 800, it is assumed that process 700 has been used to assign threads to instances of the shared resource and to assign an ordering index to each thread.

Process 800 starts (step 802) when the shared memory resource is to be updated. At step 804, a loop counter (j) is initialized to zero. At step 806, the jth thread of each subset is instructed to access the shared resource. At step 808, the threads are synchronized; as noted above, all threads of the CTA may be synchronized, or only threads in the same sharing subset. At step 810, if the loop counter j has not reached its terminal value (e.g., k−1), then loop counter j is incremented (step 812), and process 800 returns to step 806 to allow the next thread of each subset to access the resource. Once loop counter j has reached its terminal value (step 810), process 800 ends (step 814). It should be noted that the end of process 800 does not necessarily coincide with the end of thread execution; threads may perform other processing work after updating the shared resource. In some instances, that processing work may include updating the shared resource again, in which case process 800 may be invoked again to perform the update.

To the extent that the order in which threads access a given instance of the resource is predictable, the shared resource can be used to transfer information from one thread to another. For instance, in embodiments described above, when a thread with order index i=1 accesses its assigned instance of the resource, it is known that a thread with i=0 has already accessed that instance while other threads assigned to that instance have not. Thus, the thread with order index i=0 can write information to its assigned instance of the shared memory resource, and the thread with i=1 can read that information, which is guaranteed to have come from the thread with i=0. Similarly, the thread with i=1 can write new information to the shared resource for consumption by the thread with i=2.

It will be appreciated that the processes for controlling access to a shared resource described herein are illustrative and that variations and modifications are possible. Steps described as sequential may be executed in parallel, order of steps may be varied, and steps may be modified or combined.

Further Embodiments

Embodiments described above provide techniques for controlling access to a shared memory resource such that not more than one thread at a time attempts to access any one instance of the resource. In addition, threads that access the same instance of the resource do so in a predictable, consistent order. In one embodiment where the shared resource is a set of counters used for a radix sort operation, using the techniques described herein results in double the performance of the radix sort, as compared to providing a set of m counters for each thread. This doubling of performance can occur because, due to space constraints in the shared memory, providing each thread with m counters may require reducing the radix (e.g., from 8 bits to 4 bits); this doubles the number of summing and sorting passes required to complete the sort.

While the invention has been described with respect to specific embodiments, one skilled in the art will recognize that numerous modifications are possible. For instance, although embodiments described above may make reference to a counter as the shared memory resource, it will be apparent that other shared memory resources might be substituted. For instance, the shared memory resource might be an array of m counters (e.g., as used in a radix sort). More generally, a shared memory resource can be any resource that different threads might need to update. In some embodiments, the shared memory resource might be used to convey information from one thread to another, as noted above. The number of instances of the shared memory resource may be as many or few as desired; in some embodiments, all of the threads might share access to the same instance of the resource.

While the embodiments described above may make reference to specific hardware and software components, those skilled in the art will appreciate that different combinations of hardware and/or software components may also be used and that particular operations described as being implemented in hardware might also be implemented in software or vice versa.

In some embodiments, program code for controlling access to a shared resource in the manner described herein can be packaged as a set of library functions that CTA programs can invoke as needed. Such program code can also be included directly in a CTA program that implements any algorithm in which it is useful to aggregate information— e.g., a count of various conditions or occurrences—across multiple threads. Examples include radix sort, collision detection, and the like. Such programs are applicable in a variety of contexts including physics modeling (e.g., for video games), transparency calculations, scientific computations (e.g., in bioinformatics), and so on.

Computer programs incorporating features of the present invention may be encoded on various computer readable media for storage and/or transmission; suitable media include magnetic disk or tape, optical storage media such as compact disk (CD) or DVD (digital versatile disk), flash memory, and the like. Such programs may also be encoded and transmitted using carrier signals adapted for transmission via wired, optical, and/or wireless networks conforming to a variety of protocols, including the Internet. Computer readable media encoded with the program code may be packaged with a compatible device or provided separately from other devices (e.g., via Internet download).

Thus, although the invention has been described with respect to specific embodiments, it will be appreciated that the invention is intended to cover all modifications and equivalents within the scope of the following claims.

What is claimed is:

1. A method of controlling access to a shared memory resource, the method comprising:
  defining a thread array having a plurality of threads, each thread having a unique thread identifier, each thread being configured to execute a same program, wherein the program includes updating a shared memory resource;
  defining a number (C) of instances of the shared memory resource, wherein the number C is less than the number of threads in the thread array; and
  executing the thread array, wherein execution of the thread array includes:
    assigning each thread to one of the C instances of the shared memory resource such that the number of threads assigned to any one of the instances of the shared memory resource is at least one and not more than a number k, where k is at least two;
    determining an ordering index for each thread such that no two threads that are assigned to the same instance of the shared memory resource have the same ordering index; and
    executing, within each of the threads, an instruction to update the instance of the shared memory resource assigned thereto, wherein a time at which the instruction is executed for each thread is controlled such that only threads with a same ordering index update the respective instances of the shared memory resource assigned thereto at the same time.

2. The method of claim 1 wherein during the act of assigning each thread to one of the instances of the shared memory resource, the thread identifier of each thread is used to assign that thread to one of the instances of the shared memory resource.

3. The method of claim 2 wherein the thread identifiers are sequential identifiers and the act of assigning each thread to one of the instances of the shared memory resource includes:
  assigning up to k threads with sequential thread identifiers to each instance of the shared memory resource.

4. The method of claim 3 wherein determining an ordering index for each thread includes:
  computing, for each thread, an index i=tid % k, wherein tid is the thread identifier of the thread,
  wherein the index i is the ordering index.

5. The method of claim 1 wherein executing the instruction to update the shared memory resource includes:
  executing a first instruction that allows only threads having a first value of the ordering index to update the instance of the shared memory resource assigned thereto;
  synchronizing the threads at a first synchronization point after the execution of first instruction; and
  after synchronizing the threads, executing a second instruction that allows only threads having a second value of the ordering index to update the instance of the shared memory resource assigned thereto.

6. The method of claim 1 wherein the threads are executed in single-instruction, multiple data (SIMD) groups and wherein the act of assigning each thread to one of the instances of the shared memory resource includes:

assigning the threads to the instances of the shared memory resource such that all threads assigned to the same instance of the shared memory resource are threads that are executed in the same SIMD group.

7. The method of claim 6 wherein controlling access to the shared resource based on the ordering index includes:
issuing a first update instruction to a first one of the SIMD groups, wherein the first instruction allows only threads having a first value of the ordering index to update the respective instance of the shared memory resource assigned thereto; and
after completing execution of the first instruction for the first one of the SIMD groups, issuing a second instruction to the first one of the SIMD groups, wherein the second instruction allows only threads having a second value of the ordering index to update the respective instance of the shared memory resource assigned thereto.

8. The method of claim 1 wherein the shared memory resource implements a counter and wherein updating the shared memory resource includes incrementing an instance of the counter.

9. The method of claim 1 wherein the shared memory resource implements an array of counters and wherein during the act of updating the shared memory resource, each thread increments one counter in an instance of the array of counters.

10. A method of sorting data values, the method comprising:
defining a first thread array having a plurality of threads, each thread having a unique thread identifier, each thread being configured to execute a same program, wherein the program includes updating an array of counters that includes one counter for each of a plurality of possible data values to reflect an actual data value determined by the thread;
defining a number (C) of instances of the array of counters, wherein the number C is less than the number of threads in the thread array;
executing the thread array, wherein execution of the thread array includes:
assigning each thread to one of the C instances of the array of counters such that the number of threads assigned to each instance of the array of counters is at least one and not more than a number k, where k is at least two;
determining an ordering index for each thread such that no two threads that are assigned to the same instance of the array of counters have the same ordering index;
determining an actual data value for each thread, wherein the actual data value corresponds to one of the counters in the array of counters;
executing, within each of the threads, an instruction to update the counter corresponding to the actual data value, wherein a time at which the instruction is executed for each thread is controlled such that only threads with a same ordering index perform the update at the same time; and
storing the values from the C instances of the array of counters to a memory; and
defining a second thread array having a plurality of threads, each thread being configured to execute a same program, wherein the program includes reading the stored values from the memory and using the stored values to sort the actual data values.

11. The method of claim 10 wherein the thread identifiers are sequential identifiers and the act of assigning each thread to one of the instances of the array of counters includes:
assigning up to k threads with sequential thread identifiers to each instance of the array of counters.

12. The method of claim 11 wherein determining an ordering index for each thread includes:
computing, for each thread, an index i=tid % k, wherein tid is the thread identifier of the thread,
wherein the index i is the ordering index.

13. The method of claim 10 wherein executing the instruction to update the counter includes:
executing a first instruction that allows only threads having a first value of the ordering index to update the counter corresponding to the actual data value;
synchronizing the threads at a first synchronization point after the execution of first instruction; and
after synchronizing the threads, executing a second instruction that allows only threads having a second value of the ordering index to update the counter corresponding to the actual data value.

14. A computer program product comprising a non-transitory computer readable storage medium encoded with program code for controlling operation of a computer system, the program code including:
program code for defining a thread array having a plurality of threads to be executed by a computer system, each thread having a unique thread identifier, each thread being configured to execute a same program, wherein the program includes updating a shared memory resource;
program code for defining a number (C) of instances of the shared memory resource, wherein the number C is less than the number of threads in the thread array; and
program code to be executed by the threads of the thread array, wherein the program code to be executed by the threads of the thread array includes:
program code for assigning each thread to one of the C instances of the shared memory resource such that the number of threads assigned to any one of the instances of the shared memory resource is at least one and not more than a number k, where k is at least two;
program code for determining an ordering index for each thread such that no two threads that are assigned to the same instance of the shared memory resource have the same ordering index; and
program code for updating the shared memory resource, including program code for controlling a time at which the instruction is executed by each thread such that only threads with a same ordering index update the respective instances of the shared memory resource assigned thereto at the same time.

15. The computer program product of claim 14 wherein the thread identifiers are sequential identifiers and wherein the program code for assigning each thread to one of the instances of the shared memory resource includes:
program code for assigning up to k threads with sequential thread identifiers to each instance of the shared memory resource.

16. The computer program product of claim 15 wherein the program code for determining an ordering index for each thread includes:
program code for computing, for each thread, an index i=tid % k, wherein tid is the thread identifier of the thread,
wherein the index i is the ordering index.

17. The computer program product of claim 14 wherein the program code for updating the shared memory resource includes:

program code that allows only threads having a first value of the ordering index to update the instances of the shared memory resource assigned thereto;

program code for synchronizing the threads at a first synchronization point after the execution of the program code that allows the threads having a first value of the ordering index to update the respective instances of the shared memory resource assigned thereto; and program code, executable after the program code for synchronizing the threads, that allows only threads having a second value of the ordering index to update the respective instances of the shared memory resource assigned thereto.

* * * * *